United States Patent [19]

O'Dea

[11] Patent Number: 5,780,782

[45] Date of Patent: Jul. 14, 1998

[54] ON-BOARD SCALE WITH REMOTE SENSOR PROCESSING

[75] Inventor: James O. O'Dea, San Clemente, Calif.

[73] Assignee: Hi-Tech Transport Electronics, Inc., Eugene, Oreg.

[21] Appl. No.: 971,759

[22] Filed: Nov. 17, 1997

Related U.S. Application Data

[63] Continuation of Ser. No. 388,954, Feb. 15, 1995, abandoned.

[51] Int. Cl.[6] .......................... G01G 19/08; G01G 19/52
[52] U.S. Cl. ............................ 177/136; 177/137; 177/50
[58] Field of Search ................................ 177/136, 137, 177/138, 139, 141, 50; 73/1.13

[56] References Cited

U.S. PATENT DOCUMENTS

| | | | |
|---|---|---|---|
| 3,154,160 | 10/1964 | Rockwell | 177/136 |
| 3,306,384 | 2/1967 | Ross | 177/136 |
| 3,603,418 | 9/1971 | Schmidt et al. | 177/136 |
| 3,854,540 | 12/1974 | Holmstrom, Jr. | 177/136 |
| 4,067,061 | 1/1978 | Juhasz | 177/136 |
| 4,258,421 | 3/1981 | Juhasz et al. | 177/136 |
| 4,328,494 | 5/1982 | Goodall | 177/136 X |
| 4,456,084 | 6/1984 | Miller | 177/136 X |
| 4,588,038 | 5/1986 | Takagi | 177/136 |
| 4,651,838 | 3/1987 | Hamilton et al. | 177/136 X |
| 4,832,141 | 5/1989 | Perini et al. | 177/136 X |
| 4,884,644 | 12/1989 | Reichow | 177/136 X |
| 4,917,197 | 4/1990 | Waite, Jr. | 177/136 X |
| 5,076,375 | 12/1991 | Dillon et al. | 177/45 |
| 5,117,929 | 6/1992 | Nakamura et al. | 177/185 |
| 5,119,895 | 6/1992 | Gradert | 177/136 X |
| 5,161,628 | 11/1992 | Wirth | 177/136 X |
| 5,167,289 | 12/1992 | Stevenson | 177/136 |
| 5,410,109 | 4/1995 | Tarker et al. | 177/136 |
| 5,478,974 | 12/1995 | O'Dea | 177/136 X |

FOREIGN PATENT DOCUMENTS

0 540 741 A1    5/1991    European Pat. Off.

OTHER PUBLICATIONS

"Load Analyzer" brochure, 4 pages, Copyright 1978, The Pactronics Corporation, Cucamonga, California.
"Load Indicator for Ore Haulers" Pamphlet YM 18–103 NA, 4 pages, Asea Inc., White Plains, New York.

*Primary Examiner*—Michael L. Gellner
*Assistant Examiner*—Randy W. Gibson
*Attorney, Agent, or Firm*—Klarquist Sparkman Campbell Leigh & Whinston

[57] ABSTRACT

An on-board weighing system employs a master unit, and one or more remote units to which weight sensors are connected. Calibration information for each weight sensor is stored in the remote unit to which it is connected. Analog weight related signals generated by the weight sensors also are converted by the remote units to digital sensor values. The remote units are connectable by a communications network with the master unit such that the master unit can read the digital sensor value and calibration information of each weight sensor for processing to yield vehicle weight. The on-board weighing system facilitates trailer swapping by automatically recording and tracking calibration information for the weight sensors in the remote units which together are mounted on the trailers that are swapped.

20 Claims, 7 Drawing Sheets

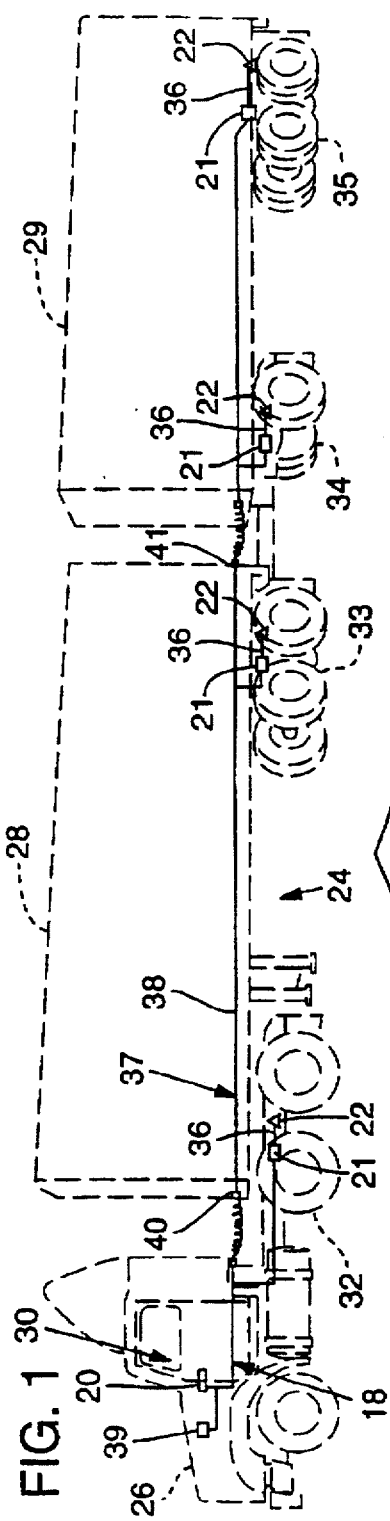
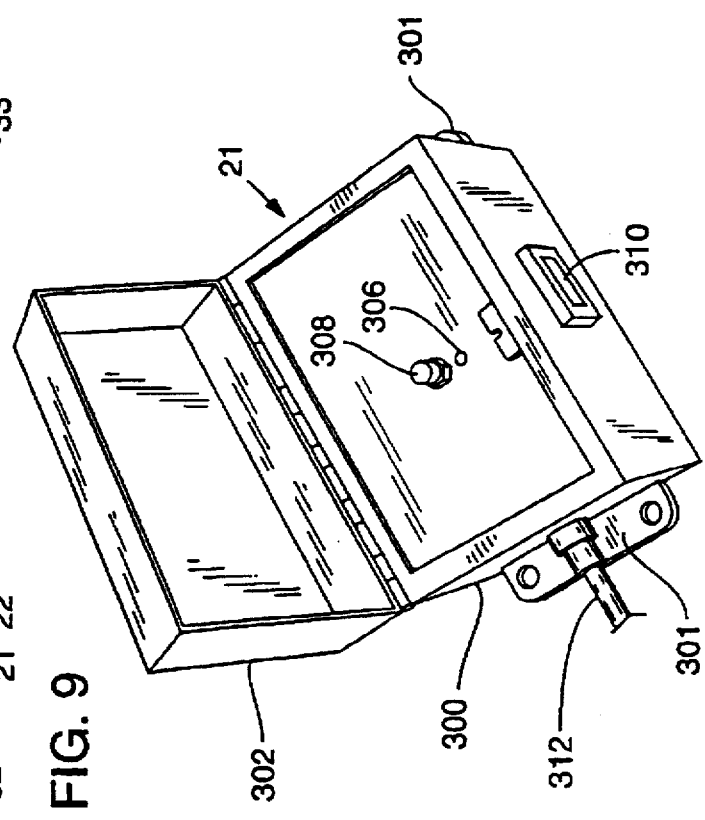
FIG. 1
FIG. 9

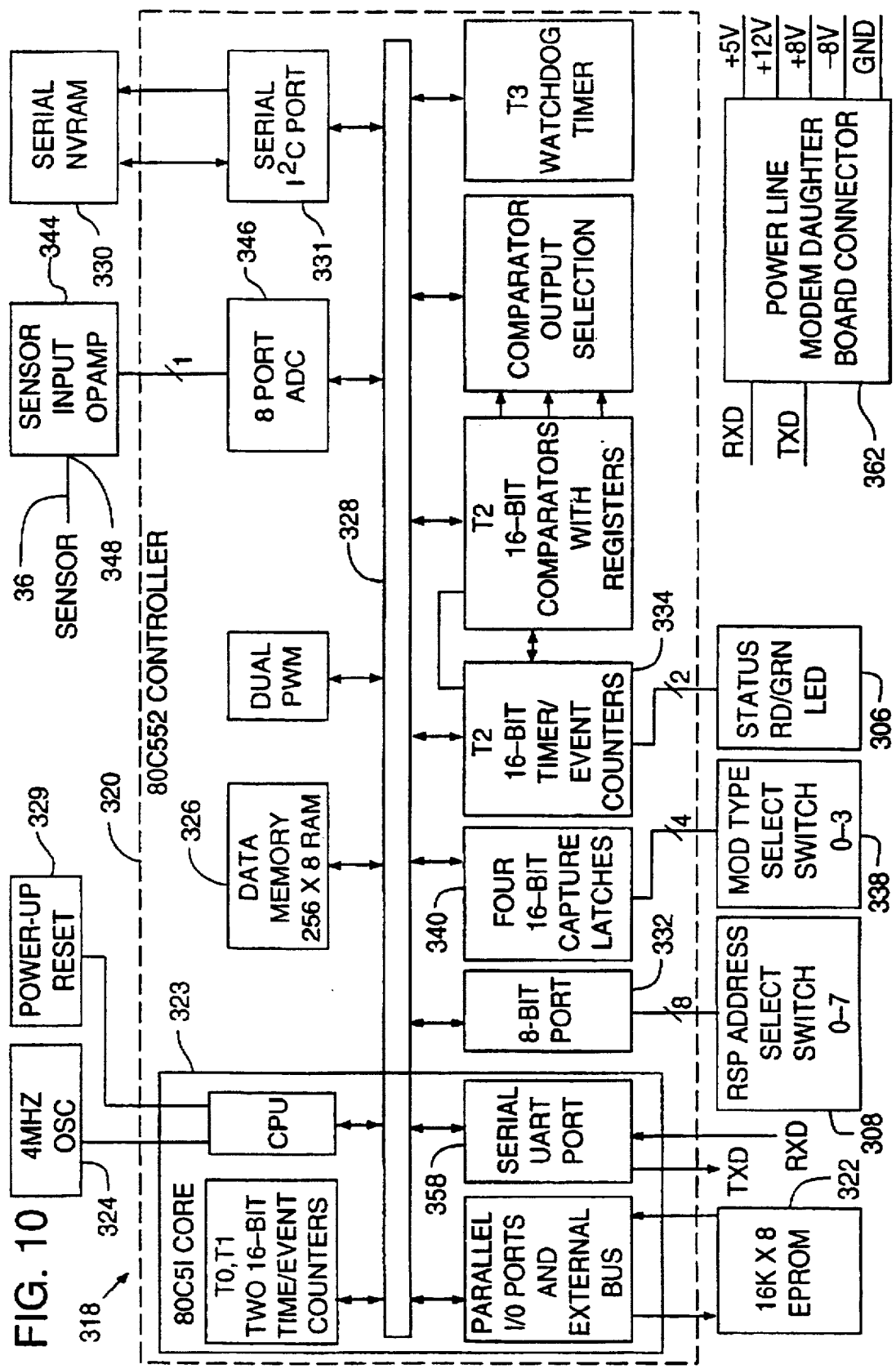

ON-BOARD SCALE WITH REMOTE SENSOR PROCESSING

This application is a continuation of application No. 08/388,954, filed on Feb. 15, 1995 now abandoned.

FIELD OF THE INVENTION

This invention relates to an on-board weighing system for vehicles having interchangeable trailers.

BACKGROUND OF THE INVENTION

The weight of a vehicle is often of crucial importance, especially to carriers in the trucking industry. In the trucking industry, the cost of delivering a load for commercial purposes is assessed to the customer according to the weight of the load and the distance it must travel. Knowledge of load weight is therefore necessary to ensure that the customer is assessed the full price of transporting the load. Weight information can also be used to optimize the load at or near the vehicle's maximum capacity.

Previously, vehicle operators have relied on private or government-operated stationary scales or weigh stations for load weight information. Usually, though, the stationary scale is located inconveniently far from the customer's loading dock. Thus, the vehicle operator has had to rely on the customer or shipping broker's quoted load weight or must travel, sometimes out of his or her way, to the nearest stationary scale for an accurate measurement. If the load weight quote proves erroneous at a stationary scale, the vehicle operator may have to return to the customer's loading dock to obtain full payment. The vehicle operator's inability to accurately determine the load weight at the loading dock, therefore, can result in wasted operator time, wasted vehicle travel mileage and time, and erroneous or fraudulent freight charges.

The weight of commercial cargo vehicles is also important from the perspective of public safety and highway maintenance. Overloading a commercial cargo vehicle can create a hazard by reducing the vehicle's stability and braking ability. An overloaded commercial cargo vehicle also causes significantly greater wear to public highways and to the vehicle itself. Governments therefore regulate vehicle weight by specifying a maximum legal load limit and fining vehicle operators for any overage. The load limit laws, however, have been enforced using the same stationary scales relied on by operators to determine a vehicle's loaded weight for pricing purposes. Law enforcement agencies have even been known to use the records of privately operated stationary scales in enforcing the load limit laws. Vehicle operators may therefore lack the ability to detect non-compliance before being subject to liability for overloading.

Accordingly, an on-board weighing system offers significant advantages over stationary scales. With on-board weighing systems, vehicle operators can determine vehicle weight at the loading dock or while under way to ensure accurate freight charge calculation, optimize load weight, and voluntarily comply with load limits.

Various prior on-board weighing devices are known. The devices have employed various weight sensor apparatus for sensing the weight of the vehicle's load, including load cells, strain gauges, displacement transducers on leaf or coil spring suspended vehicles, or pressure transducers on height-levelled, air spring suspended vehicles. The various weight sensor apparatus generate an electrical signal related to the load weight of the vehicle. Generally, these prior devices further comprise a cab-mounted read-out device for displaying the vehicle's load weight in response to a weight sensor signal.

A problem with prior on-board weighing devices is created by the practice common to the trucking industry of swapping trailers of tractor/trailer combination trucks between trips. Characteristics of the various weight sensor apparatus employed by weighing devices typically vary significantly even between apparatus of the same type. It is therefore necessary to recalibrate the read-out devices every time trailers are swapped. Since accurate recalibration requires the use of a stationary scale, the advantages of having an on-board scale are lost with every trailer swap. As an alternative to completely repeating the calibration procedure, a written log of calibration settings of the read-out device for each of a plurality of trailers that may be used with a tractor can be kept in a log book or with markings directly on the trailers. However, the calibration settings of a read-out device must still be reset manually to those of a new trailer after swapping takes place, which consumes operator time and effort. Further, because manual resetting is required, the read-out device may be set to incorrect calibration settings due to human error or forgetfulness.

An object of the invention therefore is to provide an on-board vehicle scale which does not require recalibration after trailer swapping.

A further object of the invention is an on-board vehicle scale which does not require manually tracking calibration settings of trailers, or manually adjusting calibration settings after trailer swapping.

SUMMARY OF THE INVENTION

The present invention is an on-board vehicle weighing apparatus and method for trailer swapping without recalibration. The apparatus and method automatically record and track calibration information for weight sensors to avoid manually adjusting calibration settings when trailer swapping is practiced.

According to a preferred embodiment of the invention, an on-board vehicle weighing apparatus comprises a master processor and one or more remote sensor processors. Each remote sensor processor is connected to a weight sensor, and has non-volatile memory for storing calibration information related to the weight sensor. The remote sensor processor and weight sensor can be located for example on a trailer of the vehicle which, from time to time, is swapped. The remote sensor processor attaches to a communications network connected to the master processor. The master processor reads the calibration information from the remote sensor processor when processing a signal generated by the weight sensor to determine a weight of the vehicle, such as the weight on a suspension component of the trailer or the gross vehicle weight. The master processor then displays the weight, such as on a cab-mounted read-out device. When the trailer is swapped and a remote sensor processor of a new trailer attached to the communications network, the vehicle's master processor continues to determine the weight of the vehicle without manual recalibration.

According to a further aspect of the invention, the master processor determines calibration information for a weight sensor mounted on the vehicle, such as from a plurality of weight measurements made on a stationary scale. The master processor transmits this calibration information to a remote sensor processor for the weight sensor, which records the calibration information for later use in measuring vehicle weight. The remote sensor processor retains the calibration information even after swapping of a trailer on which the weight sensor and remote sensor processor are mounted. The weight sensor is thus useable with any vehicle having a master processor to which the trailer is swapped. The remote sensor processor need only be attached to the vehicle's communication network, without any further manual calibration or entry of calibration information. The invention thereby provides automatic tracking of calibration information for weight sensors of trailers that are swapped.

According to yet another aspect of the invention, the communications network connecting a master processor and one or more remote sensor processors comprises a power line modem network. The master processor and each remote sensor processor has a power line modem, each of which connects to a pair of power lines of the vehicle on which the processors are installed. Attachment of the power line modems to existing power lines of the vehicle for interprocessor communication facilitates after-market installation of the on-board weighing apparatus.

Additional features and advantages of the invention will be made apparent from the following detailed description of a preferred embodiment which proceeds with reference to the accompanying drawings.

BRIEF DESCRIPTION OF THE DRAWINGS

FIG. 1 is a schematic view of a tractor/trailer rig with an on-board weighing system according to a preferred embodiment of the present invention.

FIG. 9 is a front perspective view of a remote sensor processor unit in the on-board weighing system of FIG. 1.

FIG. 10 is a block diagram of a main electronic circuit board including a microprocessor and non-volatile memory in the remote sensor processor unit of FIG. 9.

DETAILED DESCRIPTION OF THE PREFERRED EMBODIMENT

Figure 2:
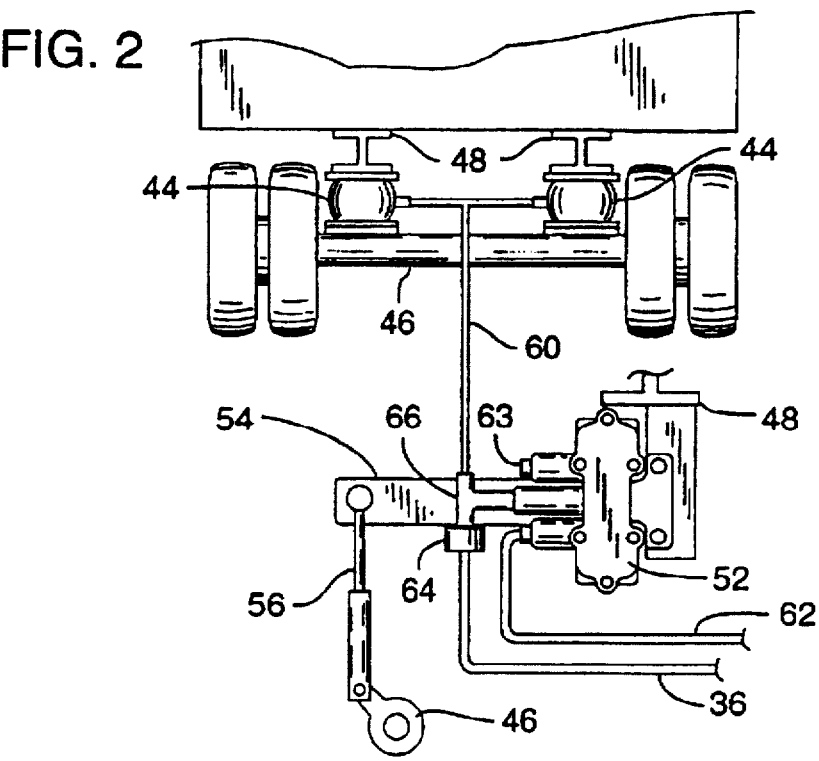
FIG. 2 is a schematic view of an air suspension adapted to serve as a weight sensor according to a preferred embodiment of the invention for use in the on-board weighing system of FIG. 1.

With reference to FIG. 1, an on-board weighing system 18 according to a preferred embodiment of the present invention comprises a master processing and display unit (hereafter "master unit") 20, one or more remote sensor processing units (hereafter "remote units") 21, and one or more weight sensors 22. The weighing system is installable on a vehicle 24 to provide accurate vehicle weight measurements available on demand. For example, in the embodiment illustrated in FIG. 1, the weighing system is installed on a cargo vehicle 24 comprising a tractor 26 and double trailers 28, 29 which may be swapped between trips. To provide easy access by a vehicle operator, the master unit 20 is generally located in a cab portion 30 of the tractor 26. The weight sensors 22 can have various configurations and are generally associated one-to-one with weight-supporting components 32–35 of the vehicle 24 to generate electrical signals related to a weight of the vehicle and any load carried on their respective components 32–35. Generally, the weight supporting components 32–35 are suspension groups of the vehicle 24, each of which comprises an axle assembly of one or more axles, wheels and related suspension equipment which supports a portion of a frame of the vehicle. Alternatively, the weight-supporting components 32–35 can be a frame or like weight-supporting structure of the vehicle 24 which supports the weight of a platform and load.

The weight sensors 22 are electrically connected one-to-one with the remote units 21 by cables 36. Each of the remote units 21 stores calibration information for the respective weight sensor to which it is connected. The remote units 21 are further interconnected with the master unit 20 by a communications network 37. Via the communications network 37, the remote units 21 communicate the weight-related signals from the weight sensors 22 and the calibration information for the weight sensors to the master unit 20. The master unit 20 processes the weight-related signals using the calibration information to determine various vehicle weight parameters and display the same.

In the preferred embodiment of the invention, the communications network 37 comprises a four wire cable (hereafter "comlink/power cable") 38 which connects to the master unit 20 and each of the remote units 21. The comlink/power cable 38 in some embodiments of the invention can include existing electrical wiring of the vehicle 24, such as power wires for the lights on the trailers 28, 29. To power the master unit 20 and each of the remote units 21, the vehicle's electrical system 39 provides power voltages to the master unit 20 and remote units 21 on two wires (hereafter "vehicle power wires") of the comlink/power cable 38. The master unit 20 and remote units 21 also communicate with each other on the remaining two wires (hereafter "comlink wires") of the comlink/power cable 38 using power line modems (described below). Between the tractor 26 and trailer 28 and between the trailers 28 and 29, the comlink/ power cable 38 includes disconnect plugs 40 and 41, respectively, by which the cable can be separated for detachment of the trailers 28, 29 from the vehicle 24. The disconnect plugs 40, 41 preferably are neoprene-coated for weatherproofing and durability.

Referring to FIG. 2, a large percentage of commercial cargo vehicles currently in use employs air suspensions. Typical air suspensions can be easily and inexpensively adapted to serve as a weight sensor 22 for generating an electrical signal related to the weight of a vehicle and load on an axle assembly. In a typical air suspension, a pair of air bags 44 is mounted between each axle 46 of a vehicle and its frame 48. The inflation of the air bags 44 is regulated with a height-levelling valve 52 mounted to the vehicle frame 48 and operated by a valve actuator arm 54 and push-rod 56 connected to the axle 46. The height levelling valve 52 introduces additional compressed air to or exhausts air from the air bags 44 through an air line 60 connecting the levelling valve 52 and the air bags 44 to support the vehicle frame 48 at a predetermined, fixed height above the axle 46. The compressed air is typically supplied to the levelling valve 52 by a second air line 62 from an air compressor (not shown) driven by the vehicle's motor. Excess air is vented from an exhaust port 63. With air bag inflation properly regulated by a height levelling valve 52, the internal pressure of the air bags 44 is related to the weight of the vehicle supported on the air bags.

Adaptation of the air suspension to serve as a weight sensor is accomplished by attaching a conventional pressure transducer 64 to the air line 60 connecting the levelling valve 52 and the air bags 44. Pressure transducer attachment is readily effected by detaching the air line 60 from the levelling valve 52, then connecting the air line 60, levelling valve 52 and pressure transducer 64 with a tee connector 66. The pressure transducer 64 generates an electrical signal related to the internal pressure of the air bags, and hence related to the weight supported on the air suspension. The signal generated by the pressure transducer 64 is transmitted to a connected remote unit 21 (FIG. 1) through the cable 36. If the vehicle is equipped with separate levelling valves controlling the inflation of the air bags of each axle assembly, separate signals related to the weight on each axle assembly can be generated. An air suspension adapted to serve as a sensor 22 of this type is described by Perini et al. in U.S. Pat. No. 4,832,141, the disclosure of which is incorporated herein by reference.

Figure 3:
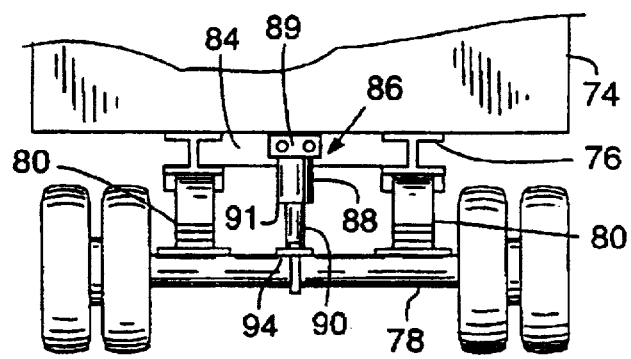
FIG. 3 is a schematic view of a weight sensor according to another embodiment of the invention comprising a leaf spring suspension and a displacement transducer mounted between a frame and a frame supporting axle assembly of a vehicle for use in the on-board weighing system of FIG. 1.

Referring now to FIG. 3, the sensors 22 can be alternatively embodied in any apparatus capable of generating a signal related to a weight parameter of a vehicle. For example, in a vehicle 74 in which a frame 76 of the vehicle is suspended on an axle assembly 78 using two or more mechanical leaf or coil springs 80, the springs are compressed according to the weight of the vehicle and load on the springs. The distance separating the frame or underside 84 of the vehicle from the axle assembly is therefore related to the weight of the vehicle and load on the axle assembly 78. To generate a signal related to the weight on the axle assembly 78, a displacement transducer 86 is mounted between the axle 78 and the underside 84 of the vehicle. A typical displacement transducer suitable for this purpose comprises a housing 88 attached at one end 89 to the vehicle underside 84 and having a slidably extending rod 90 at an opposite end 91. A distal or extending end 94 of the rod 90 is attached to the axle assembly 78. A potentiometer (not shown) within the housing 88 and operatively engaged by the rod 90 generates an electrical signal related to the displacement of the vehicle frame 76 from the axle assembly 78 and hence related to the weight on the axle assembly. The displacement transducer 86 and mechanical springs 80 of an axle assembly 78 in a vehicle with a mechanical spring suspension can therefore serve as a sensor 22 in accordance with the invention.

Figure 4:
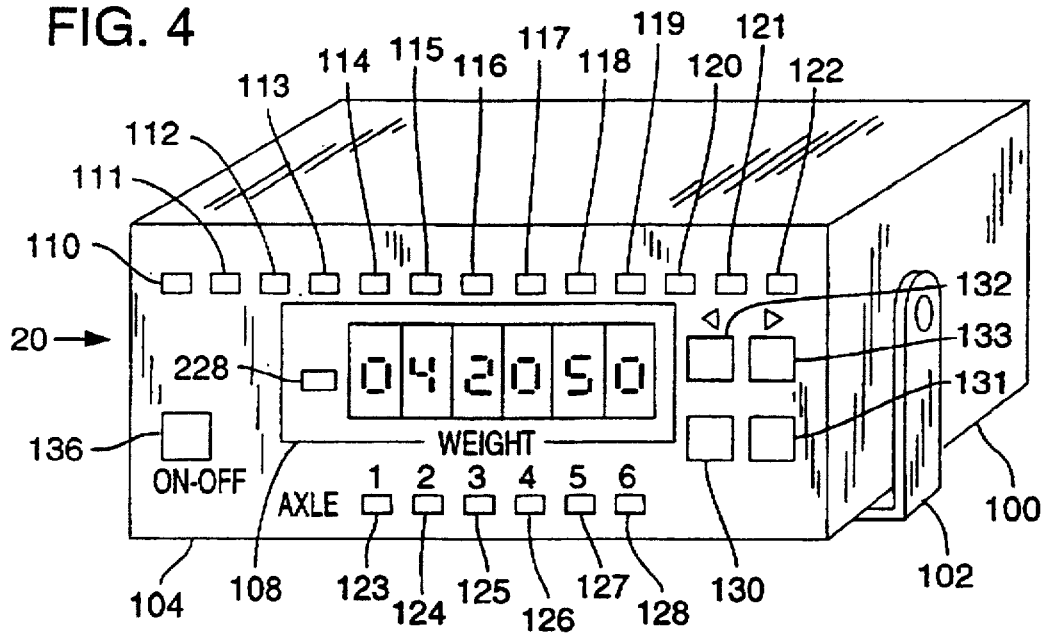
FIG. 4 is a front perspective view of a cab-mounted console in the on-board weighing system of FIG. 1 including the front panel.
Figure 5:
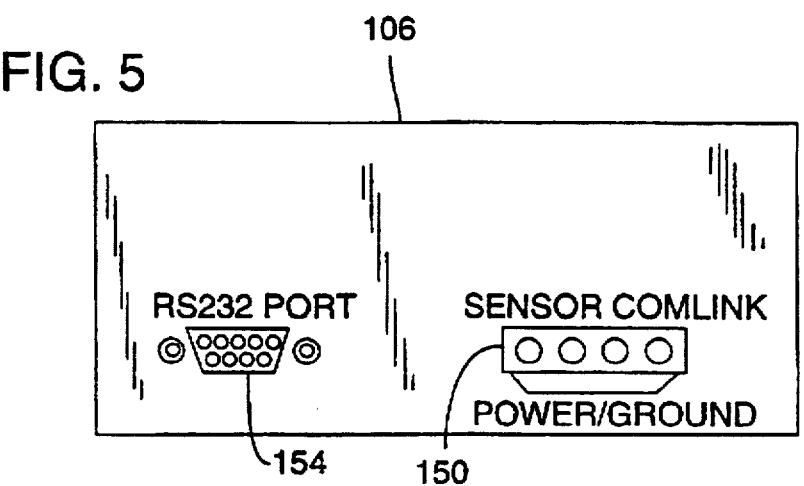
FIG. 5 is a rear view of the console in FIG. 4 including the back panel.

Referring now to FIGS. 4 and 5, in the preferred embodiment of the invention, the master unit 20 comprises a generally box-shaped console 100. The console 100 has a mounting bracket 102 for mounting the console in a convenient location in the cab 30 of the vehicle 24 such as above or below a dashboard. The console 100 further comprises a front panel 104 and a back panel 106. On the front panel 104 (FIG. 4) are a digital numeric display 108, light emitting diodes 110–128 for indicating unit status, data entry keys 130–133, and an on/off switch 136. On the back panel 106 (FIG. 5) are a sensor comlink/power connector 150 for connection to comlink/power cable 38, and an RS-232 standard data input/output port 154.

Figure 6:
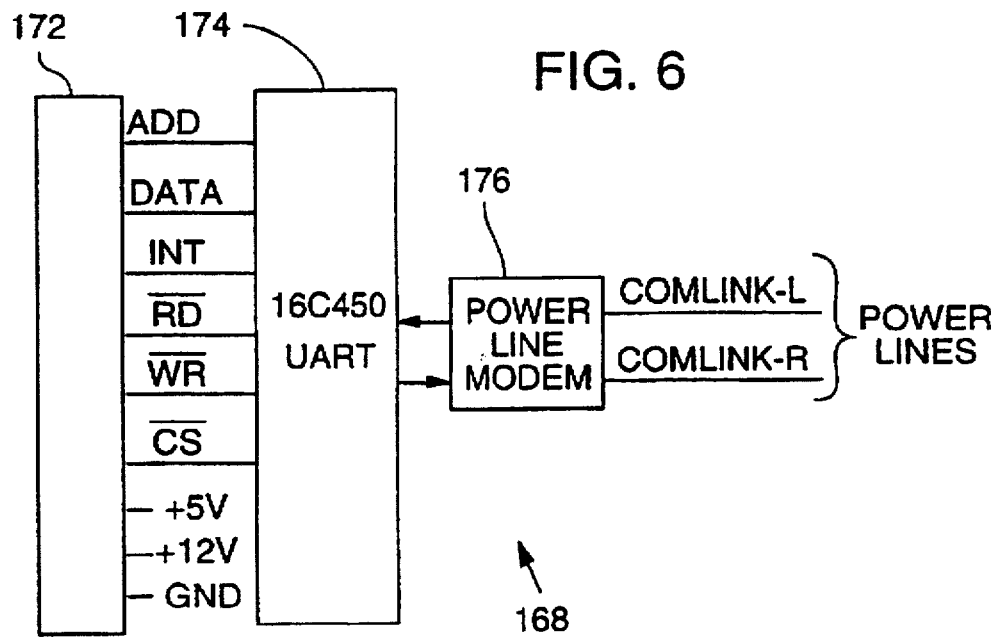
FIG. 6 is a block diagram of a daughter board in the console of FIG. 4.
Figure 7:
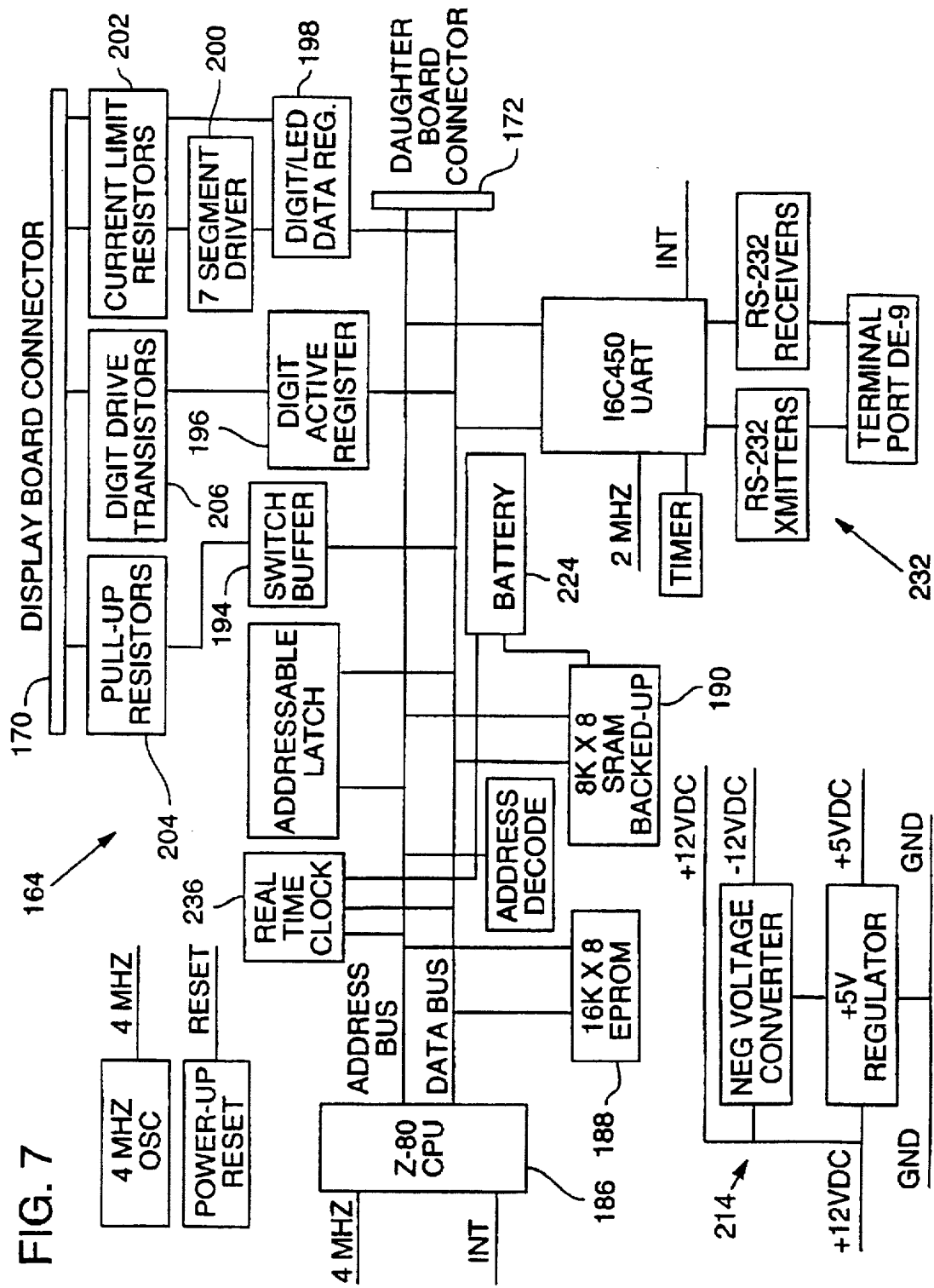
FIG. 7 is a block diagram of a main board in the console of FIG. 4.
Figure 8:
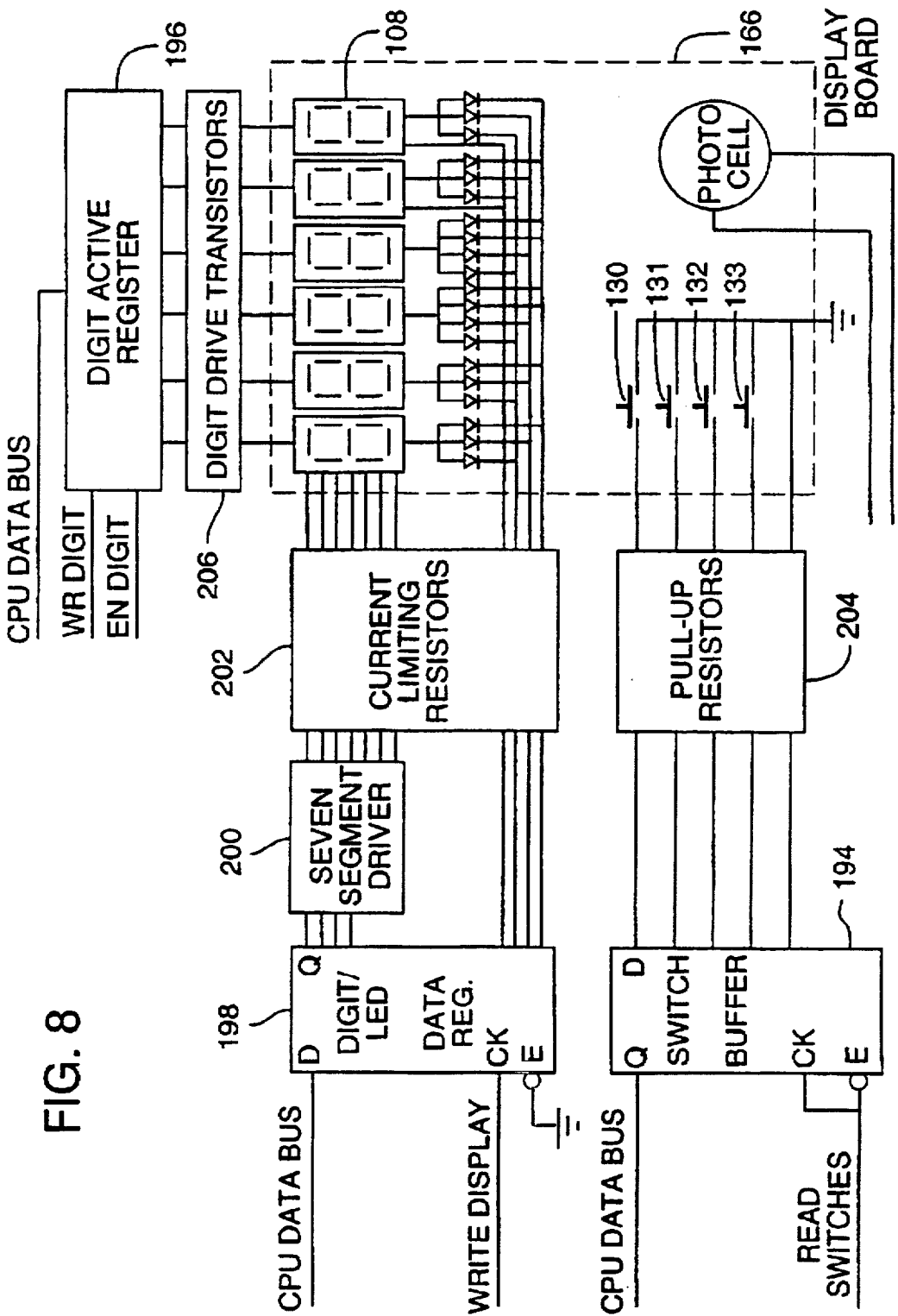
FIG. 8 is a block diagram of a display board in the console of FIG. 4.

With reference to FIGS. 6–8, the console 100 houses electronic circuitry for processing the weight related signals of the weight transducers 22 using the calibration information stored in the remote sensor processors 21. The circuitry is primarily located on three printed circuit boards including a main board 164 (FIG. 7), a display board 166 (FIG. 8), and a daughter board 168 (FIG. 6). The daughter board 168 provides circuitry including a UART 174 and a power line modem 176 for communicating with the remote sensor processors 21 over the communications network 37. The main board 164 provides processing circuitry including a microprocessor 186, a read-only memory (EPROM) 188, and a random-access memory (SRAM) 190 (with a battery back-up 224) for processing the weight signals using the calibration information. In the preferred embodiment, the processor 186 is a Z-80 type microprocessor. The main board 164 also provides circuitry including data registers 194–198, seven segment driver 200, current limiting resistors 202, pull-up resistors 204, and drive transistors 206 for indicating the vehicle weight measurements and unit status information on the display 108 and LEDs 110–128 (both on the display board 166). The display and daughter boards 166, 168 are attached to the main board 164 with connectors 170, 172, respectively, which also provide electrical interconnections between the circuitry on the boards.

The master unit 20 is preferably supplied with electrical power from the vehicle's electrical system 39 on the vehicle power wires in the comlink/power cable 38 (FIG. 1). The two wires generally are connected to a junction box of the vehicle's electrical system to provide power (typically +12 volts) and ground voltages.

The comlink wires of the comlink/power cable 38 are utilized in the on-board weighing system 18 for communications between the master unit 20 and remote units 21. The power line modem 176 (FIG. 6) in the master unit 20 transmits and receives carrier on/off modulated signals on the comlink wires for communication with the remote units 21. The power line modem 176 may suitably be a NE5050 power line modem which utilizes a 100 KHz carrier frequency signal with amplitude shift-keying modulation for a half-duplex mode communications protocol at 600 baud. The communications protocol preferably supports 7 bit serial data, even parity, and 1 stop bit.

With reference to FIG. 9, the remote units 21 preferably are housed in weatherproof box-like enclosures 300 which have mounting brackets 301 for attachment to the vehicle 24 with bolts or the like. Each enclosure 300 includes a hinged top 302 which provides access to a bi-color status indicator LED 306 and a six position address select switch 308. The interior of the enclosure 300 is filled with a solid, waterproof silicon base compound (potting) which covers all component of the remote unit that are within the enclosure 300 except the status LED 306 and address selection switch 308. Using the switch 308, the vehicle operator selects a different one of six addresses (i.e. address 1, 2, 3, ..., or 6) for each of the remote units 21. For example, the remote units 21 in the vehicle 24 illustrated in FIG. 1 can be assigned addresses in ascending order (i.e. 1, 2, 3, and 4) from front to rear of the vehicle by appropriately setting the address select switches 308 of the units 21. The status indicator LED 306 intermittently flashes green when the remote unit is polled and operating correctly. The status indicator LED 306 flashes red once on power-up, and lights solid red after a failed self-test routine to indicate malfunction. In normal use, the top 302 is latched shut with a latch 310.

The enclosure 300 also has a connector cable 312 extending from one exterior side of the enclosure 300. The connector cable 312 includes wires for soldering or otherwise connecting to the wires of one of the sensor cables 36 and to the wires of the comlink/power cable 38.

Figure 11:
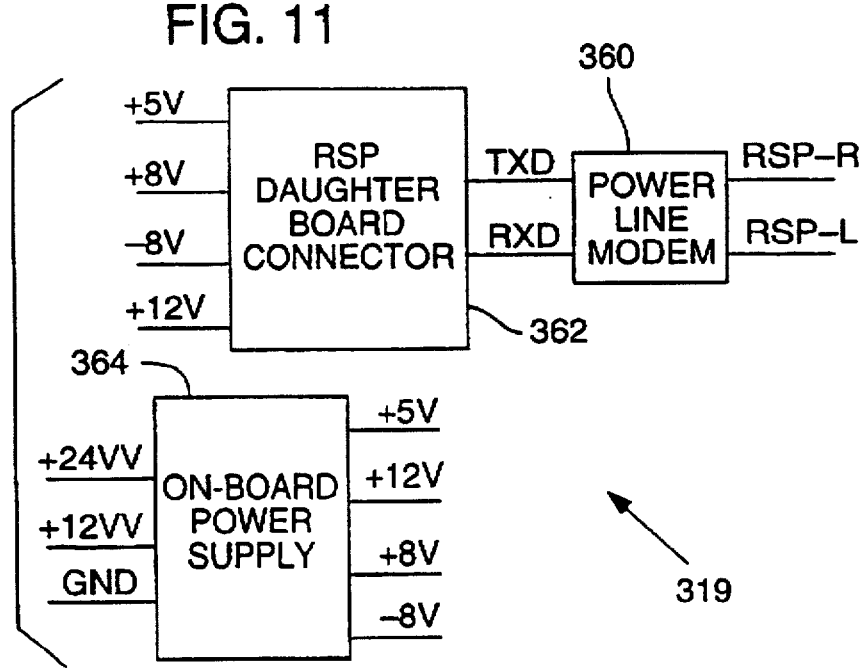
FIG. 11 is a block diagram of a daughter electronic circuit board including a power line modem and power supply in the remote sensor processor unit of FIG. 9.

Referring now to FIGS. 10 and 11, the enclosure 300 of each remote unit 21 houses electronic circuitry supported on main 318 and daughter 319 printed circuit boards for storing calibration information of the weight sensor connected to the remote unit 21. The main board 318 includes a microcontroller 320 which controls operations of the remote unit 21 according to a software program stored in a read-only memory (EPROM) 322. The microcontroller 320 may suitably be an 80C552 highly integrated microcontroller integrated circuit with an 80C51 microprocessor core 323 clocked by a 4 MHz oscillator 324. The microcontroller 320 includes a random-access memory (RAM) 326 connected to the microprocessor core 323 by a bus 328. The microcontroller 320 stores temporary data in the RAM 326. The microcontroller 320 also stores data, such as calibration information, which is to be retained when the remote unit is shut-off in a serial non-volatile memory (NVRAM) 330 connected via a serial port 331 to the bus 328. The microprocessor core 323 is reset at power-up by a power-up reset circuit 329.

The microprocessor core 323 also is connected by bus 328 to the address select switch 308 and the status indicator LED 306 through an 8-bit port 332 and 16-bit timer/event counters 334, respectively. A module type select switch 338 (a 4-bit DIP switch in the preferred embodiment) also is connected to the microprocessor core 323 by the bus 328 through capture latches 340. The microprocessor core 323 reads an 8-bit remote unit address selected by the operator with the address select switch 308 from the port 332, and a 4-bit module type set with the module type select switch 338 from the capture latches 340. The microprocessor core 323 also controls the status indicator LED 306 by writing control signals to the timer/event counters 334. The port 332, counters 334, and latches 340 are each included in the microcontroller 320 in the preferred embodiment.

The main board 318 of the remote unit 21 also comprises an operational amplifier 344 and an analog to digital converter 346. The operational amplifier 344 has a sensor input 348 which connects to the cable 36 for receiving the weight-related signal from the weight sensor 22 which is connected to the remote unit 21. The operational amplifier 344 removes any current/voltage offset of the remote unit's associated weight sensor 22. The analog to digital converter 346 digitizes the weight related signal, which in the preferred embodiment is an analog signal, to a digital value that can be read by the microprocessor core 323. The analog to digital converter 346 is included in the microcontroller 320 and connected to the microprocessor core 323 by the bus 328.

The microprocessor core 323 includes an internal serial port 358 which connects to a power line modem 360 on the daughter printed circuit board 319. The main and daughter boards 318, 319 are connected via a connector 362. The powerline modem 360, in turn, connects to the power/comlink cable 38. The remote unit's power line modem 360 interfaces with the power line modem 178 of the master unit 20 to provide communication between the microcontroller 320 of the remote unit 21 and the microprocessor 186 (FIG. 7) of the master unit 20. Preferably, the remote unit's power line modem 360 is identical to that of the master unit 20.

The daughter board 319 further includes a power supply circuit 364 which is powered by current from the vehicle's electrical system provided on the power wires of the cable 38. The power supply circuit 364 supplies power voltages (+8V, −8V, +12V, +5V) required by the circuitry on the boards 318, 319 of the remote unit.

In the preferred embodiment, information is exchanged between each of the remote units 21 and the master unit 20 using a half-duplex serial communications protocol with even parity error checking. Even parity error checking is utilized to ensure that all data transfers between the master and remote units 20, 21 are correct. When the master unit 20 detects a parity error in a transmission from a remote unit, it issues a command (command "T" described below) for the remote unit to run a self test. The remote units 21 all reject any transmission received with a parity error and do not respond to the transmission.

The master unit 20 controls all information transfers from the remote units 21. The remote units 21 respond to a set of commands (hereafter "remote unit command set") which are sent by the master unit 20 in the following format (using ASCII characters):

:AA C DDDDDD<CR><LF> where the ASCII ":" character indicates message start, "AA" is a two character address field ("01" through "06" in the preferred embodiment), "C" is a one character command field, "DDDDDD" is a six character data field, the ASCII "<CR><LF>" characters indicate message end, and each field is separate by an ASCII space character. In the address field, the master unit 20 specifies any of the six remote unit address using the ASCII characters "01" through "06," respectively. The commands that may be specified in the command field are the ASCII characters shown in the following Table 1.

TABLE 1

| Remote Unit Command Set. | |
|---|---|
| Command | Function |
| R | Receive and store ratio value |
| O | Receive and store offset (unsprung weight) value |
| T | Run self test |
| D | Transmit all sensor data |

During calibration of the weight sensors which is described in further detail below, the master unit 20 utilizes the "R" and "O" commands to store calibration information (a ratio value and an unsprung weight or offset value in the preferred embodiment) for each weight sensor 20 in its respective remote unit 21 (in the NVRAM 330). This calibration information is later retrieved by the master unit 20 for use in determining weight parameters of the vehicle by polling the appropriate remote unit 21 of each weight sensor with the D command. The master unit 20 polls each of the six addresses in turn to determine whether any remote units 21 set to the addresses are connected to the master unit 20. After issuing a D command, the master unit 20 waits approximately 250 ms for a response before timing out. When the master unit 20 times out, the remote unit 21 addressed by the D command is presumed by the master unit 20 to be disconnected or inoperative. The master unit 20 waits approximately 1 second between each poll.

The remote units 21 are programmed to respond to a D command which specifies their address after a delay of approximately 50 ms. The remote units 21 respond to a poll specifying their address by transmitting data in the following format:

:AA M X S nnnn oooooo vvvv<CR><LF> where the ASCII character ":" indicates message start, "AA" is a two character address field, "M" is a one character module type field, "X" is a one character software revision field, "S" is a one character remote unit status field, "rrrrrr" is a six character ratio value field, "oooooo" is a six character offset value field, "vvvv" is a four character digitized weight signal value field from the remote unit's connected weight sensor, the ASCII characters "<CR><LF>" indicate message end, and an ASCII space character separates each field. The values transmitted in the ratio, offset, and signal value fields are processed by the master unit 20 to determine various vehicle weight parameters according to equation (1) as described more fully below.

The character transmitted by the remote unit 21 in the module type field is determined by the module type switch 338 of the remote unit. The module types that may be specified in the module type field are shown in the following table 2.

TABLE 2

Remote Unit Module Types

| Module Type Identifier | Module Type Description |
| --- | --- |
| A | Air pressure sensor |
| B | temperature sensor |

The software revision field is a one byte value used to track software upgrades of the program controlling the remote units 21. The remote unit status field is used by the remote units 21 to report a self test failure and calibration valid as shown in the following table 3.

TABLE 3

Remote Unit Status Field

| Bit Position | Description |
| --- | --- |
| 7 | Not Used |
| 6 | Not Used |
| 5 | Not Used |
| 4 | Calibration Valid Flag |
| 3 | Self Test Failure Flag |
| 2 | Bit 2 of Self Test Failure Number |
| 1 | Bit 1 of Self Test Failure Number |
| 0 | Bit 0 of Self Test Failure Number |

Referring again to FIG. 4, the master unit 20 determines various vehicle weight measurements by processing the weight related signals of the weight sensors 22 using the calibration information stored in the remote units 21 (which the master unit 20 obtains from polling the remote unit's address as described above). In the preferred embodiment, the master unit 20 is operative to determine the weights of each of the weight supporting components 32-35 of the vehicle, as well as gross vehicle weight, and tare vehicle weight. The particular weight measurement displayed by the master unit 20 is selected by the vehicle operator using the data entry keys 130-133 and the function LEDs 110-122 (the LEDs in a row along the top of the front panel 104 in FIG. 4). (The master unit 20 continually polls the remote unit addresses 01-06 independently of which weight is selected for display.) Each of the function LEDs 110-122 indicate a function of the master unit 20 that can be selected by the operator by activating two of the data entry keys 130, 131 labeled "select" and "enter." When the select key 130 is first activated, the left-most or "KILO" LED 110 of the function LEDs 110-122 begins to flash, indicating that a corresponding function can be selected. Each further activation of the select key 130 causes the next function LED in sequence from left to right to flash. When the LED corresponding to the desired function is flashing, the enter key 131 is activated to select the function. When a function is selected, its corresponding LED remains lit. Several of the functions can be selected in combination, while others are mutually exclusive. The functions that can be selected in the preferred embodiment include the following: "KILO," "SCAN," "GVW," "TARE," "AXLE," "PORT," "TIME," "DATE," "CAL," "EMPTY," "FULL," "RATIO," and "UNSPRUNG WEIGHT."

In its normal mode, the master unit 20 continually processes the weight related signal generated by each of the weight sensors 22 to determine an axle weight associated with each of the weight supporting components 32-35 of the vehicle 24. In the preferred embodiment in which the components 32-35 are respectively axle assemblies of the vehicle 24, the axle weight of a selected component is the weight applied by the component against a road or other surface supporting the component which includes the weight of the axles, wheels, tires, suspension, and other constituent parts of the selected component as well as the weight of a portion of the vehicle and load supported by the component. The particular component 32-35 whose weight is displayed by the master unit 20 is operator selectable. First, the "AXLE" function is selected as described above using the function LEDs 110-122 and the select and enter keys 130, 131. When the AXLE function has been selected, the AXLE function LED 114 remains lit and the left-most LED 123 of the axle LEDs 123-128 (those in a row at the bottom of the front panel 104) flashes. Each subsequent activation of the select key 130 causes the next axle LED in sequence from left to right to flash. Activation of the enter key selects the weight-supporting component 32-35 whose corresponding axle LED is flashing. Only one weight-supporting component at a time can be selected for calibration or weight display. After one of the weight-supporting components 32-35 is selected, the AXLE function LED 114 is no longer lit.

Referring to FIGS. 6, 7, and 10, the processing of the weight related signal for the selected component 32-35 to determine its axle weight is carried out by the microprocessor (processor) 186 (FIG. 7) of the master unit 20 in accordance with the instructions of a program stored in the EPROM 188 (FIG. 7). As described above, the weight sensor 22 of the selected component generates an analog signal related to the weight supported on the component. The analog signal is converted to a digital sensor value by the analog to digital converter 346 (FIG. 10) in the remote unit 21 connected to the weight sensor 22. Calibration information in the form of a ratio value and an offset value also are stored in the remote unit 21. Accordingly, when the operator selects the component with the axle function, the processor 186 of the master unit 20 polls the selected component's remote unit 21 by transmitting a D command specifying an address of the remote unit for the selected component from the power line modem 176 (FIG. 6). The remote unit 21 of the selected component responds as described above by transmitting the digital sensor value and calibration information for the selected component using its power line modem in the daughter card 360 (FIG. 10). The processor 186 stores the digital sensor value and calibration information in the SRAM 190 (FIG. 7).

After acquiring the digital sensor value and calibration information, the processor 186 processes the digital value using the calibration information to yield the selected component's axle weight. In the preferred embodiment, the calibration information includes two constants, a ratio value and an unsprung weight value. The ratio and unsprung weight values characterize a relationship between the weight related signal of the selected component and its weight. Generally, the unsprung weight of a weight-supporting component is the portion of the axle weight that is not supported on the component (e.g. the weight of the axles, wheels, tires, and suspension). The ratio value is a conversion or scaling factor for converting units of the weight related signal to units of weight, such as pounds. In embodiments of the invention employing weight sensors 22 of the type shown in FIG. 2, the ratio value is generally related to the active inner surface area of the air bags in the air suspension supporting the vehicle frame on the axle assembly.

The processor 186 (FIG. 7) comprises circuitry and software routines for adding, subtracting, multiplying and dividing which are used to process the digital value. (The Z-80 microprocessor which is used in the preferred embodiment includes an arithmetic logic unit with adder and subtractor circuitry and software routines for performing multiplication and division with the logic unit's adder and subtractor circuitry.) The processor determines the selected component's weight by multiplying the selected component's digital sensor and ratio values to form a product value and adding the component's unsprung weight value to the product value. The sum of the unsprung weight and product values is, in the preferred embodiment, the selected component's axle weight in pounds. Expressed mathematically, the selected component's axle weight is determined according to the following equation:

$$W_A = R.s + W_U \qquad (1)$$

where $W_A$ is the selected component's axle weight, R is the ratio value, s is the digital value of the weight related signal, and $W_U$ is the unsprung weight value.

The processor 186 displays the selected component's axle weight in pounds on the display 108 using the display circuitry 194–206. However, if the "KILO" function is also selected, the processor 186 further applies a pounds-to-kilos conversion formula to the selected component's axle weight to determine the weight in kilos, then displays the weight in kilos on the display 108.

The operator also can choose to have the master unit 20 determine and display the gross vehicle weight by selecting the "GVW" function using the function LEDs 110–122 and the select and enter keys 130, 131 as described above. When the GVW function is selected, the GVW LED 112 remains lit. To yield the gross vehicle weight, the master unit 20 determines the weight of each of the active components as described above using the digital sensor value and calibration information from their remote units. (To determine the active components of the vehicle 24, the master unit 20 continually polls each address to determine whether there is a remote unit assigned to that address. When no response is received for two successive polls to an address, the address is determined not to correspond to any active component. Those addresses which do have responding, but uncalibrated remote units 21 also are considered inactive. The remote units 21 indicate that they are not calibrated by leaving the calibration valid flag not set when responding to the poll. The master unit 20 displays zero for the weight and calibration information of inactive components.) The weights of the active axle assemblies are summed by the processor 186 to determine the gross vehicle weight. The gross vehicle weight is displayed on the numeric display 108 in pounds or, if the KILO function has been selected, in kilos.

The "SCAN" function can also be selected as described above using the SCAN LED 111 and the keys 130, 131 to cause the master unit 20 to determine the weights of all active components 32–35 and the gross vehicle weight as described above and to display those weights in succession for intervals of approximately two seconds. The corresponding axle LED 123–128 is lit as each component's weight is displayed on the numeric display 108 to identify the displayed weight. The GVW LED 112 and all active axle LEDs are lit to identify when the gross vehicle weight is displayed. Inactive addresses are skipped during the scan.

The master unit 20 in the preferred embodiment also determines the tare weight of the vehicle 24 when the "TARE" function is selected. The tare weight of a vehicle is defined as the weight of the load alone, or the gross vehicle weight minus the unloaded weight of the vehicle itself. When the TARE function is selected, the master unit 20 continuously determines and displays the difference between the current gross vehicle weight and the gross vehicle weight at the time the TARE function is selected. Thus, if the TARE function is selected when the vehicle is empty, the weight determined and displayed by the master unit 20 is the true tare weight as defined above. The TARE function can also be used to simply measure a change in the gross vehicle weight. For example, by selecting the TARE function prior to adding an additional load to an already loaded vehicle, the weight of the additional load will be determined and displayed after loading. A negative change in the tare weight, such as when the TARE function is selected prior to removing a portion of the load, can also be determined and displayed. A "NEG" LED 228 on the numeric display 108 will light to indicate a negative tare weight.

Accurate axle weight measurements of a weight-supporting component 32–35 through a range of loaded axle weights requires calibration of the ratio and unsprung weight values of the component at two different axle weights in the preferred embodiment of the invention. To calibrate the ratio and unsprung weight values for a selected component, the axle weight of the component is measured at a first weight, preferably at empty or no load on the component, using a stationary scale. While the selected component is at the first weight, the operator selects the component to be calibrated using the AXLE function as described above, and then selects the "CAL" function using the function LEDs 110–122 and select and enter keys 130, 131. The component to be calibrated by the CAL function also is selected using the AXLE function as described above. When the CAL function is selected, the CAL LED 118 and the axle LED 123–128 of the selected component remain lit.

The operator further selects the "EMPTY" function. When the EMPTY function is also selected, a weight is displayed on the numeric display 108. Using the left and right arrow keys 132, 133, the operator increases (by activating the right arrow key) or decreases (by activating the left arrow key) the displayed weight until the numeric display 108 displays the first weight as measured by the stationary scale. The first weight is then entered into the master unit 20 by activating the enter key 131. When the first weight is entered, the processor 186 (FIG. 7) stores the first weight in the SRAM 190. The SRAM 190 is provided with back-up battery power to avoid data loss during the calibration procedure, such as if power to master unit 20 is turned off or otherwise removed At this time, the processor 186 also polls the remote unit 21 at the selected address to obtain the digital sensor value at the first weight, which it also stores in the SRAM 190.

When entry of the first weight is complete, the weight of the selected component is changed to a second weight by loading the vehicle, preferably to a fully loaded weight. The second weight of the selected component is then measured on a stationary scale. To enter the second weight, the operator selects the "CAL" and "FULL" functions, adjusts the displayed weight with the arrow keys 132–133, and activates the enter key 131. The processor 186 will then obtain the digital sensor value for the selected component by polling its remote unit 21, and store the entered second weight and the digital sensor value at the second weight in the SRAM 190.

When both the first and second weights have been entered, the processor 186 determines the ratio and unsprung weight values of the selected component. The processor 186 subtracts the first weight from the second weight to find the difference between the two weights, and subtracts the digital sensor value at the first weight from the digital sensor value at the second weight to find a difference between the digital sensor values. Then, the difference between the first and second weights is divided by the difference in the digital values to find the ratio value. Expressed mathematically, the ratio value is determined according to the following equation:

$$R = \frac{W_2 - W_1}{s_2 - s_1} \quad (2)$$

where R is the ratio value, $W_2$ is the second or fully loaded weight, $W_1$ is the first or empty weight, $s_2$ is the digital value of the weight related signal at the second weight, and $s_1$ is the digital value at the first weight.

To determine the unsprung weight value for the selected component (once its ratio value is known), the processor 186 subtracts the product of the ratio value and the digital value at the first weight from the first weight. Expressed mathematically, the unsprung weight value is then determined according to the following equation:

$$W_U = W_1 - R \cdot s_1 \quad (3)$$

where $W_U$ is the unsprung weight value.

After determining the ratio and unsprung weight values for the selected component, the master unit 20 transmits this calibration information to the selected component's remote unit 21 with the "R" and "O" commands described above. The values are transmitted in the data field of these commands. In response, the selected component's remote unit 21 records the calibration information in its NVRAM 330 (FIG. 10). The NVRAM 330 retains the calibration information for subsequent weight determinations as described above, including when the power of the remote unit 21 is off, such as during trailer swapping. The on-board weighing system 18 thereby automatically records and tracks the calibration information for the weight sensors 22 in the remote units 21 mounted on various trailers 28, 29 that are swapped onto the vehicle 24. Any trailer which is properly equipped with calibrated remote units 21 for its weight sensors 22 can be swapped onto the vehicle 24 and immediately weighed by the system 18 without further calibration, and without manual tracking or entry of calibration information. The remote units 21 of trailers swapped onto the vehicle 22 need only have its cable 38 connected at the disconnect plug 40 or 41.

The master unit 20 provides further weight reporting capabilities in addition to providing a visual display of the weights on the numeric display 108. When the "PORT" function is selected, the master unit 20 determines the weights of the active axle assemblies and the gross vehicle weight as described above. The unit then transmits a "report" including the weight information using transmitting/receiving circuitry 232 on the main board 164 (FIG. 7) to a device connected to the data input/output port 154 on the back panel 106 (FIG. 5). The data input/output port 154 is connectable to a printer, a computing device, a data transmitting device, or like devices. When the port 154 is connected to a printer, a printed record of the vehicle's weights can be provided. Remote reporting of the vehicle's weights can also be provided when the data port 154 is connected to a computing or data transmitting device.

To provide "time and date stamping" of the transmitted report, the master unit 20 includes a real time clock circuit 236 (with same battery back-up as SRAM 190) on the main board 164 (FIG. 7). The correct time is set in the unit by selecting the "TIME" function with the function LEDs and select and enter keys 130–131, then entering the time using the left and right arrow keys 132, 133, numeric display 108, and the enter key 131. The correct time is set in a like manner using the "DATE" function. After the correct time and date are set in the master unit 20, the real time clock circuit 236 tracks the current time. Later, when the PORT function is selected, the current time and date are included in the transmitted report.

The data input/output port 154 and transmitting/receiving circuitry 232 can also be used to receive commands from an external source such as a computing device, to allow remote control of the master unit 20. The commands recognized by the master unit 20 are generally equivalent to the functions selectable with the function LEDs 110–122 and select and enter keys 130, 131. For example, the commands allow a remote computing device to enter time, date, and ratio and unsprung weight values for a vehicle's weight-supporting components. A remote computing device can also command the master unit 20 to transmit report information.

In the preferred embodiment of the invention, the weight sensors 22 generate signals which are linearly related to a weight supported on the components 32–35. For example, a sensor 22 of the type shown in FIG. 2 generates a signal that is linearly related to the axle assembly weight when the pressure transducer 64 operates linearly and the height leveling valve 52 maintains the vehicle frame 48 at a constant height above the axle 46. The linearity of a signal generated by a sensor of the type shown in FIG. 3 depends on the springs 80 compressing such that the displacement between the vehicle underside 84 and the axle 78 decreases linearly in relation to the weight of the vehicle 24 and on the displacement transducer 86 operating linearly. Calibration information sufficient to characterize the relationship between the signal produced by these sensors and the weight supported on their associated weight-supporting component 32–35 can be reduced to two coefficients of a linear equation. Accordingly, in the preferred embodiment which utilizes linear weight sensors 22, the remote units 21 store calibration information which may consist of only two values, such as the ratio and unsprung weight values described above.

In alternative embodiments of the invention, the on-board weighing system 18 can employ weight sensors 22 which generate signals that are non-linearly related to weight. In such cases, the remote units 21 desirably store more than two values as calibration information for their attached weight sensors. For example, the remote units 21 may store the co-efficients of higher order non-linear equations to characterize the relationship between the signals and weight. In other embodiments, the remote units 21 may store a plurality of points (value pairs) of a graph of signal values versus weight as calibration information. In such other embodiments, the master unit 20 generally interpolates between the points to obtain the weight, or otherwise performs an analysis based on the points to obtain the weight.

Having described and illustrated the principles of our invention with reference to a preferred embodiment, it will be recognized that the invention can be modified in arrangement and detail without departing from such principles. In view of the many possible embodiments to which the principles of our invention may be put, it should be recognized that the detailed embodiments are illustrative only and should not be taken as limiting the scope of our invention. Rather, we claim as our invention all such embodiments as may come within the scope and spirit of the following claims and equivalents thereto.

I claim:

1. An on-board weighing apparatus for a vehicle having at least one weight-supporting suspension group, comprising:
   at least one sensor being mountable on the vehicle and associated in a one-to-one relationship to the at least one suspension group, each of the at least one sensor being operative to generate a signal related to a weight supported on its respective suspension group;
   at least one remote sensor processing unit mountable on the vehicle and associated in a one-to-one relationship to the at least one sensor, each of the remote sensor processing unit being operative to store signal-to-weight conversion parameters related to its respective sensor, the signal-to-weight conversion parameters characterizing a conversion of the weight related signal to a weight of the vehicle at the respective suspension group associated with the at least one sensor;
   a host processing unit mounted on the vehicle and in communication with the at least one remote sensor processing unit, the host processing unit being operative to receive the signal generated by each of the at least one sensor, to read the signal-to-weight conversion parameters from each of the at least one remote sensor processing unit, and to generate weight data for each of the at least one suspension group as a function of the signal-to-weight conversion parameters and the signal from its respective sensor and remote sensor processing unit; and
   a display for providing a visual indication of the weight data.

2. The on-board weighing apparatus of claim 1 wherein the signal-to-weight conversion parameters stored by each of the at least one remote sensor processing unit comprises a signal-to-weight ratio value and an unsprung weight offset value, the unsprung weight offset value characterizing the unsprung weight of the vehicle at the respective suspension group and the signal-to-weight ratio value characterizing a relationship of the signal generated by the respective sensor to the vehicle weight at the suspension group.

3. The on-board weighing apparatus of claim 1 wherein each of the at least one remote sensor processing unit comprises an analog to digital converter coupled to its respective sensor for converting the signal of the respective sensor to a digital sensor value, the host processing unit being operative to read the digital sensor value whereby the host processing unit receives the signal from the respective sensor.

4. The on-board weighing apparatus of claim 1 comprising:
   a polling network connecting the at least one remote sensor processing unit and the host processing unit; and
   the host processing unit being operative to poll each of the at least one remote sensor processing unit to read the signal-to-weight conversion parameters from the at least one remote sensor processing unit.

5. The on-board weighing apparatus of claim 4 wherein the polling network comprises:
   a power line cable connecting to the host processing unit and the at least one remote sensor processing unit; and
   a plurality of power line modems connecting to the power line cable, one in each of the host processing unit and the at least one remote sensor processing unit.

6. The on-board weighing apparatus of claim 4 wherein each of the at least one remote sensor processing unit comprises an analog to digital converter coupled to its respective sensor for converting the signal of the respective sensor to a digital sensor value, the host processing unit being operative to poll each of the at least one remote sensor processing unit to read the digital sensor value whereby the host processing unit receives the signal generated by the respective sensor.

7. The on-board weighing apparatus of claim 4 wherein each of the at least one remote sensor processing unit has a polling address selector for use by an operator of the apparatus to select a polling address for each of the at least one remote sensor processing unit whereby the at least one remote sensor processing unit is individually identifiable by the host processing unit on the polling network.

8. The on-board weighing apparatus of claim 1 comprising:
   a plurality of data entry keys for use by an operator of the apparatus to enter data for a plurality of weights supported on the at least one suspension group into the host processing unit; and
   the host processing unit being operative to generate the signal-to-weight conversion parameters related to each of the at least one sensor based on the signal generated by said sensor at the weights and on the data, the host processing unit being operative to store the signal-to-weight conversion parameters in the sensor's respective at least one remote sensor processing unit.

9. The on-board weighing apparatus of claim 8 comprising:
   the host processing unit being operative, for each of the at least one sensor, to receive data entered with the data entry keys for a first weight and a second weight supported on the respective suspension group of the sensor, to read the signal generated by the sensor at the first and second weights, to generate signal-to-weight conversion parameters as a function of the entered data and the signal for the first and second weights, and to store the signal-to-weight conversion parameters into the respective remote sensor processing unit of the sensor.

10. A method of measuring vehicle weight, comprising:
    generating a signal related to a vehicle weight with a weight transducer;
    storing signal-to-weight conversion parameters for the weight transducer in a remote sensor processing unit connected to the weight transducer, the signal-to-weight conversion parameters characterizing a conversion of the generated signal to the vehicle weight;
    converting the signal with the remote sensor processing unit to form a digital sensor value;
    interconnecting the remote sensor processing unit and a master processing unit in a communications network;
    transmitting the signal-to-weight conversion parameters and digital sensor value from the remote sensor processing unit to the master processing unit;

processing the signal-to-weight conversion parameters and digital sensor value with the master processing unit to determine the vehicle weight; and visually indicating the vehicle weight.

11. The method of claim 10, comprising:

polling the remote sensor processing unit by the master processing unit; and transmitting the signal-to-weight conversion parameters and digital sensor value from the remote sensor processing unit to the master processing unit in response to said polling.

12. The method of claim 10, comprising:

interconnecting a plurality of remote sensor processing units with the master processing unit in the communications network;

storing signal-to-weight conversion parameters in the remote sensor processing units for a plurality of weight transducers respectively connected one-to-one to the remote processing units;

generating a plurality of signals related to portions of a vehicle weight with the weight transducers;

converting the signals with the remote sensor processing units to a plurality of digital sensor values;

transmitting the signal-to-weight conversion parameters and digital sensor value for each of the weight transducers from its respective remote sensor processing unit to the master processing unit;

processing the signal-to-weight conversion parameters and digital sensor value for each of the weight transducers with the master processing unit to determine the portions of the vehicle weight; and summing the portions of the vehicle weight with the master processing unit to yield the vehicle weight.

13. The method of claim 12, comprising:

individually polling one of the remote sensor processing units by the master processing unit;

transmitting the signal-to-weight conversion parameters and digital sensor value from said remote sensor processing unit to the master processing unit in response to said polling;

processing the signal-to-weight conversion parameters and digital sensor value transmitted from said remote sensor processing unit with the master processing unit to determine a respective portion of the vehicle weight; and visually indicating the respective portion of the vehicle weight.

14. An on-board vehicle scale for vehicles having interchangeable trailers, comprising:

a master processor mountable on a vehicle;

a weight transducer mountable on a trailer for generating a signal related to a weight supported on a suspension group of the trailer;

a remote sensor processor mountable on the trailer and connected to the weight transducer for receiving the signal;

a non-volatile memory in the remote sensor processor for storing signal-to-weight conversion parameters characterizing a conversion from the signal generated by the weight transducer to a weight of the vehicle at the suspension group;

a communications network for interconnecting the master processor and the remote sensor processor; and the master processor being operative to read the signal-to-weight conversion parameters and the signal from the remote sensor processor, and to process the signal using the signal-to-weight conversion parameters to determine the weight.

15. The on-board vehicle scale of claim 14, comprising:

the weight transducer producing an analog signal related to the weight supported on the suspension group of the trailer;

an analog to digital converter in the remote sensor processor for digitizing the analog signal; and the master processor being operative to read the digitized analog signal from the remote sensor processor.

16. The on-board vehicle scale of claim 14, comprising:

a display coupled to the master processor for visually indicating the weight.

17. The on-board vehicle scale of claim 14 wherein the communications network comprises:

a power line;

a first modem coupling the remote sensor processor to the power line; and a second power line modem coupling the master processor to the power whereby the master processor communicates with the remote sensor processor.

18. The on-board vehicle scale of claim 14, comprising:

a first weight transducer connected to a first remote sensor processor, both being mounted on a first trailer, the first remote sensor processor being connectable to the communications network when the first trailer is attached to the vehicle; and a second weight transducer connected to a second remote sensor processor, both being mounted on a second trailer, the second remote sensor processor being connectable to the communications network when the second trailer is attached to the vehicle;

the master processor being operative to read the signal-to-weight conversion parameters and the signal from the respective remote sensor processor connected to the communications network, and to process said signal using said signal-to-weight conversion parameters to determine a weight supported on a suspension group of a respective one of the first and second trailers which is attached to the vehicle, whereby the weight can be measured without recalibration when switching between the first and second trailers.

19. The on-board vehicle scale of claim 14, comprising:

a plurality of weight transducers, each for generating a signal relating to a weight supported on a suspension group of the vehicle;

a plurality of remote sensor processors connected one-to-one with the weight transducers and each being operative to store signal-to-weight conversion parameters related to its respective connected weight transducer;

the communications network interconnecting the remote sensor processors with the master processor;

the master processor being operative to read the signal and signal-to-weight conversion parameters for each weight transducer from its respective remote sensor processor, and to process the signals using the signal-to-weight conversion parameters to determine a weight of the vehicle.

20. The on-board vehicle scale of claim 14 wherein the non-volatile memory is modifiable after installation of the remote sensor processor on the vehicle, and the master processor is further operative to derive the signal-to-weight conversion parameters from input reference weights and store the signal-to-weight conversion parameters into the non-volatile memory.

* * * * *

UNITED STATES PATENT AND TRADEMARK OFFICE
CERTIFICATE OF CORRECTION

PATENT NO. : 5,780,782
DATED : July 14, 1998
INVENTOR(S) : O'Dea

It is certified that error appears in the above-indentified patent and that said Letters Patent is hereby corrected as shown below:

Title page, item [56], References Cited, should read--

| | |
|---|---|
| | Tarter et al. |
| 11/32 | R•s |
| 13/39 | R•s, |
| 16/55 | transducer; |

Signed and Sealed this

Sixteenth Day of November, 1999

Attest:

Attesting Officer

Q. TODD DICKINSON

Acting Commissioner of Patents and Trademarks